(12) United States Patent
Ravindran

(10) Patent No.: US 10,546,041 B2
(45) Date of Patent: *Jan. 28, 2020

(54) METHODS, APPARATUS, AND ARTICLES OF MANUFACTURE TO MEASURE SEARCH RESULTS

(71) Applicant: The Nielsen Company (US), LLC, New York, NY (US)

(72) Inventor: Balaji Ravindran, New York, NY (US)

(73) Assignee: THE NIELSEN COMPANY, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/671,850

(22) Filed: Aug. 8, 2017

(65) Prior Publication Data

US 2017/0337207 A1    Nov. 23, 2017

Related U.S. Application Data

(63) Continuation of application No. 14/686,003, filed on Apr. 14, 2015, now Pat. No. 9,760,648, which is a
(Continued)

(51) Int. Cl.
*G06F 16/958* (2019.01)
*G06F 16/951* (2019.01)
*G06F 16/2457* (2019.01)

(52) U.S. Cl.
CPC ...... *G06F 16/958* (2019.01); *G06F 16/24578* (2019.01); *G06F 16/951* (2019.01)

(58) Field of Classification Search
CPC ......... G06F 17/30867; G06F 17/30905; G06F 17/30864; G06F 17/30749; G06F 17/30761; G06F 17/30035
(Continued)

(56) References Cited

U.S. PATENT DOCUMENTS 5,963,914 A    10/1999    Skinner et al.
6,448,980 B1    9/2002    Kumar et al.
(Continued)

OTHER PUBLICATIONS

Google Analytics Guide, Googlel Webpages retrieved from archives org Feb. 7, 2012, published Jul. 4, 2010, http://static.googleusercontent.com/external_content/untrusted_dicp/www.google.com/en/us/grants/education/Google_Analytics_Training.pdf (50 pages). (Copy not provided—Document available in Parent U.S. Appl. No. 14/686,003).
(Continued)

*Primary Examiner* — Angelica Ruiz
(74) *Attorney, Agent, or Firm* — Hanley, Flight & Zimmerman, LLC

(57) ABSTRACT

Methods, apparatus, and articles of manufacture to measure search results are disclosed. A disclosed example method to determine an order for search results in response to a search query includes determining a first preview metric and a second preview metric for a first search result and a second search result corresponding to a search query from a requester, the first preview metric including a first ratio based on a first count of preview events for the first search result and a second count of search result impressions in the first search result, the second preview metric including a second ratio based on a third count of preview events for the second search result and a fourth count of search result impressions in the second search result; ordering the first and second search results based on the first and second preview metrics; and sending a response to the requester instructing a web browser of the requester to display the ordered search results.

20 Claims, 9 Drawing Sheets

Related U.S. Application Data continuation of application No. 13/023,170, filed on Feb. 8, 2011, now Pat. No. 9,015,141.

(58) Field of Classification Search
USPC .................. 707/600–831, 999.001–999.206
See application file for complete search history.

(56) References Cited

U.S. PATENT DOCUMENTS

| | | | |
|---|---|---|---|
| 6,470,269 | B1 | 10/2002 | Adar et al. |
| 7,146,416 | B1 | 12/2006 | Yoo et al. |
| 7,194,539 | B2 | 3/2007 | Hughes et al. |
| 7,685,191 | B1 | 3/2010 | Zwicky et al. |
| 7,844,590 | B1 | 11/2010 | Zwicky et al. |
| 9,015,141 | B2 | 4/2015 | Ravindran |
| 2004/0093406 | A1 | 5/2004 | Thomas et al. |
| 2004/0205503 | A1 | 10/2004 | Gutta |
| 2005/0256954 | A1 | 11/2005 | Shapira et al. |
| 2006/0026147 | A1 | 2/2006 | Cone et al. |
| 2006/0059440 | A1 | 3/2006 | Pry |
| 2006/0064411 | A1 | 3/2006 | Gross et al. |
| 2006/0224445 | A1 | 10/2006 | Axe et al. |
| 2006/0277167 | A1 | 12/2006 | Gross et al. |
| 2006/0288001 | A1 | 12/2006 | Costa et al. |
| 2007/0050251 | A1 | 3/2007 | Jain et al. |
| 2007/0073723 | A1 | 3/2007 | Ramer et al. |
| 2007/0074125 | A1 | 3/2007 | Platt et al. |
| 2007/0112759 | A1 | 5/2007 | Kulakow et al. |
| 2007/0124283 | A1 | 5/2007 | Gotts et al. |
| 2008/0034381 | A1 | 2/2008 | Jalon et al. |
| 2008/0065440 | A1 | 3/2008 | Graham et al. |
| 2008/0126178 | A1 | 5/2008 | Moore |
| 2008/0195483 | A1 | 8/2008 | Moore |
| 2008/0195603 | A1 | 8/2008 | Gross et al. |
| 2008/0244408 | A1 | 10/2008 | King et al. |
| 2009/0070297 | A1 | 3/2009 | Hadzima et al. |
| 2009/0112781 | A1 | 4/2009 | Heath et al. |
| 2009/0234811 | A1 | 9/2009 | Jamil et al. |
| 2009/0313220 | A1 | 12/2009 | Best et al. |
| 2009/0319522 | A1 | 12/2009 | Karstens |
| 2010/0004974 | A1 | 1/2010 | Libby et al. |
| 2010/0036809 | A1 | 2/2010 | Gerster et al. |
| 2010/0082400 | A1 | 4/2010 | Bagherjeiran et al. |
| 2010/0122178 | A1 | 5/2010 | Konig et al. |
| 2010/0125542 | A1 | 5/2010 | Doliov |
| 2010/0131339 | A1 | 5/2010 | Singh |
| 2010/0306249 | A1 | 12/2010 | Hill et al. |
| 2012/0203757 | A1 | 8/2012 | Ravindran |

OTHER PUBLICATIONS

Houshangi Ali, Internet Marketing, dissertation, School of Computer Science, University of Manchester, 2009, http://www.cs.manchester.ac.uk/resources/library/thesis_abstracts/MSc09/FullText/HoushangiAli.pdf, (105 pages). (Copy not provided—Document available in Parent U.S. Appl. No. 14/686,003).

Juan et al., AN Analysis of Search Engine Switching Behavior Using Click Streams, Wine 2005, LNCS 3828 pp. 806-815, Springer-Verlag, 2005, http://www.springerlink.com/content/p72176q523241436/fulltext.pdf, (10 pages). (Copy not provided—Document available in Parent U.S. Appl. No. 14/686,003).

Kraft et al. Searching with Context, ACM 1595933239060005, May 23-26, 2006, http://delivery.acm.org/10.1145/1140000/1135847/p477-kraft.pdf?ip=151.207.242.4&acc=ACTIVE%20SERVICE&CFID=64173514&CFTOKEN=29112588&__acm__=1327943985_f6e31d9e3fa18f98faa40dc523c68937, (10 pages). (Copy not provided—Document available in Parent U.S. Appl. No. 14/686,003).

Mukhopadhyay et al., Competition Between Internet Search Engines, Carnegie Mellon University, Jun. 30, 2001, http://heinz.cmu.edu/research/76full.pdf, (33 pages). (Copy not provided—Document available in Parent U.S. Appl. No. 14/686,003).

Sheu et al., Monopoly Power on the Web—a preliminary investigation of Search Engines, 29th Telecom Policy Research Conference 2001, Oct. 27, 2001 http://www.fravia.com/library/monopolypower.pdf, (32 pages). (Copy not provided—Document available in Parent U.S. Appl. No. 14/686,003).

Telang et al., An Empirical Analysis on Internet Search Engine Choice, Carnegie Mellon University, Dec. 2001, http://www.econ2.jhu.edu/people/harrington/375/tmw01.pdf, (34 pages). (Copy not provided—Document available in Parent U.S. Appl. No. 14/686,003).

White et al., Investigating the Querying and Browsing Behavior of Advanced Search Engine Users, SIGIR 07, ACM 97816959359770700007, Jul. 23, 2007, (8 pages). (Copy not provided—Document available in Parent U.S. Appl. No. 14/686,003).

Meierhoefer, Cameron, "comScore Voices," retrieved from http://blog.comscore.com/2010/10/comscore_september_qsearch.html, Oct. 12, 2010, (2 pages). (Copy not provided—Document available in Parent U.S. Appl. No. 14/686,003).

United States Patent and Trademark Office, "Non-Final Office Action," issued in connection with U.S. Appl. No. 13/023,170, dated Mar. 1, 2012, 23 pages. (Copy not provided as this is a USPTO document. Applicant will provide document upon request from Examiner.).

United States Patent and Trademark Office, "Final Office Action," issued in connection with U.S. Appl. No. 13/023,170, dated Oct. 26, 2012, 21 pages. (Copy not provided as this is a USPTO document. Applicant will provide document upon request from Examiner.).

United States Patent and Trademark Office, "Non-Final Office Action," issued in connection with U.S. Appl. No. 13/023,170, dated May 21, 2013, 14 pages. (Copy not provided as this is a USPTO document. Applicant will provide document upon request from Examiner.).

United States Patent and Trademark Office, "Final Office Action," issued in connection with U.S. Appl. No. 13/023,170, dated Dec. 4, 2013, 19 pages. (Copy not provided as this is a USPTO document. Applicant will provide document upon request from Examiner.).

United States Patent and Trademark Office, "Advisory Action," issued in connection with U.S. Appl. No. 13/023,170, dated Mar. 28, 2014, 4 pages. (Copy not provided as this is a USPTO document. Applicant will provide document upon request from Examiner.).

United States Patent and Trademark Office, "Non-Final Office Action," issued in connection with U.S. Appl. No. 13/023,170, dated Aug. 15, 2014, 17 pages. (Copy not provided as this is a USPTO document. Applicant will provide document upon request from Examiner.).

United States Patent and Trademark Office, "Notice of Allowance," issued in connection with U.S. Appl. No. 13/023,170, dated Dec. 23, 2014, 17 pages. (Copy not provided as this is a USPTO document. Applicant will provide document upon request from Examiner.).

United States Patent and Trademark Office, "Final Office Action," issued in connection with U.S. Appl. No. 14/686,003, dated Jan. 12, 2017, 8 pages. (Copy not provided as this is a USPTO document. Applicant will provide document upon request from Examiner.).

United States Patent and Trademark Office, "Non-Final Office Action," issued in connection with U.S. Appl. No. 14/686,003, dated May 20, 2016, 11 pages. (Copy not provided as this is a USPTO document. Applicant will provide document upon request from Examiner.).

United States Patent and Trademark Office, "Notice of Allowance," issued in connection with U.S. Appl. No. 14/686,003, dated May 16, 2017, 9 pages. (Copy not provided as this is a USPTO document. Applicant will provide document upon request from Examiner.).

| Search Engine | Web site | Impressions | Preview Events | Selections | Avg. Search Result Position |
|---|---|---|---|---|---|
| Google | www.WebSiteA.com | 10 | 9 | 8 | 1 |
| Google | www.WebSiteB.com | 10 | 2 | 1 | 2 |
| Google | www.WebSiteC.com | 10 | 5 | 3 | 3 |
| Google | www.WebSiteD.com | 10 | 5 | 0 | 4 |
| Bing | www.WebSiteA.com | 6 | 6 | 6 | 2 |
| Bing | www.WebSiteB.com | 6 | 5 | 1 | 1 |
| Bing | www.WebSiteC.com | 6 | 5 | 3 | 3 |
| Bing | www.WebSiteD.com | 5 | 2 | 0 | 4 |

METHODS, APPARATUS, AND ARTICLES OF MANUFACTURE TO MEASURE SEARCH RESULTS

RELATED APPLICATIONS

This patent arises from a continuation of U.S. patent application Ser. No. 14/686,003, filed Apr. 14, 2015, which is a continuation of U.S. patent application Ser. No. 13/023, 170, filed Feb. 8, 2011. The entirety of U.S. patent application Ser. No. 13/023,170 and U.S. patent application Ser. No. 14/686,003 are incorporated herein by reference.

FIELD OF THE DISCLOSURE

This disclosure relates generally to online measurement, and, more particularly, to methods, apparatus, and articles of manufacture to measure search results.

BACKGROUND

Some search engines use optimization algorithms to determine the order in which online search results are presented to a requester. In general, individual search results that appear earlier in a listing of search results will receive more traffic than individual search results that appear later in the listing. Some algorithms attempt to order search results by probable relevancy to the requester by determining the number of times search results have been selected previously in response to a similar query. Other algorithms attempt to order the search results to maximize search engine revenue by increasing a number of impressions (exposures of a search result to users) in a cost-per-impression pricing system and/or a number of clicks (selections of search results by users) in a cost-per-click pricing system.

BRIEF DESCRIPTION OF THE DRAWINGS

FIG. 5 is a table including example preview information that may be collected by the example monitor of FIG. 2.

DETAILED DESCRIPTION

Figure 1:
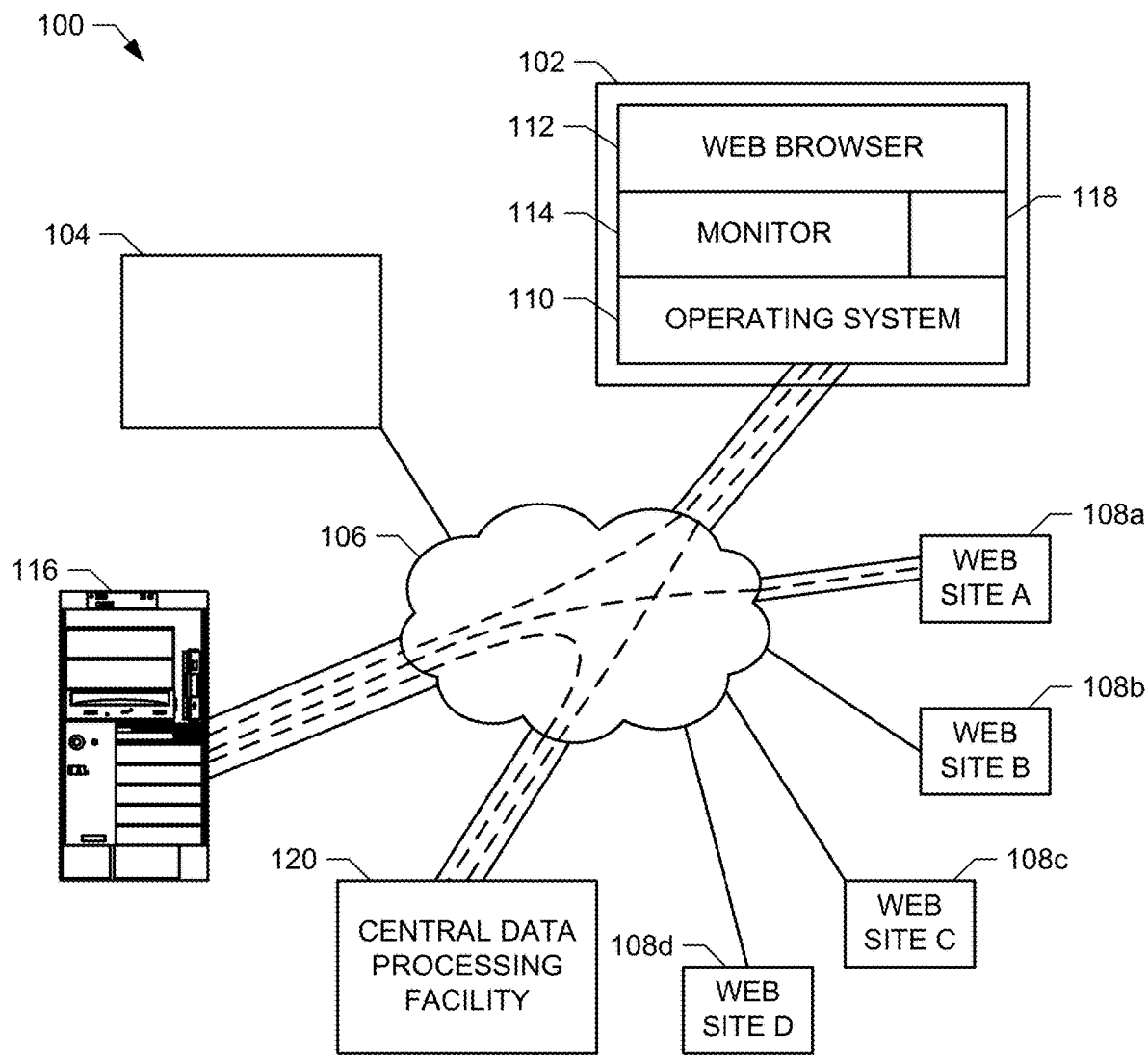
FIG. 1 is a schematic diagram of an example system to perform a web search.

When a user (e.g., a searcher, a requester) enters a search query into a typical search engine (e.g., on a web page), the search engine typically returns another web page with a listing of search results. Some search providers on the World Wide Web, such as Bing™ and Google Web Search™, allow users to view previews of search results without navigating away from the search results web page.

As used herein, the term "web page" refers to one or more files or documents retrievable by a browser via the World Wide Web (or other similar type of network) to construct a viewable image on an information presentation device associated with the browser. A web page may be static (e.g., have fixed content unless the underlying code, such as Hypertext Markup Language (HTML), is altered) or dynamic (e.g., have at least some underlying instructions, such as JavaScript, that references a source external to the document (e.g., a second file, an applet, etc.) and may change the information displayed in the web page without changes to the underlying instructions (e.g., HTML) itself). In contrast, a "web site" as used herein refers to a collection of web pages grouped by and/or retrievable from the same general Internet domain. For example, www.amazon.com is an address for a web site at the amazon.com domain. When a browser is directed to www.amazon.com, it will download a web page (e.g., the "home page") of the amazon.com site. By selecting links, doing searches, or taking other actions, the user can cause the browser to access other web pages within the amazon.com web site (e.g., amazon.com/prime).

Example methods, apparatus, and articles of manufacture disclosed herein determine a preview metric to measure search results. Example disclosed monitors detect a search request, identify a preview event for a search result link associated with the search request, determine whether the search result link associated with the preview is selected, and store an indication of whether the search result link is selected. In some examples, the monitor provides the stored data to a central data processing facility. In some such examples, the central facility aggregates data from multiple monitors and determines aggregate preview data for web pages and/or web sites. Disclosed example central data processing facilities may provide the aggregate data to search engine(s) to be used for ordering future listings of search results based on previews of web pages and/or web sites and/or may provide the aggregate data to advertisers seeking to select search signal(s) with which to place ads.

Example methods, apparatus, and articles of manufacture disclosed herein receive monitoring data including information associated with search result preview events. Some example methods, apparatus, and articles of manufacture determine preview metrics for search results based on the monitoring data. Example preview metrics disclosed herein include a hover-through rate and a hover-to-click rate. As used herein, a hover-through rate refers to a ratio of preview events of a particular advertisement to impressions of the advertisement in search results and/or a ratio of impressions of the advertisement to a number of preview events of the advertisement. As used herein, a hover-to-click rate refers to a ratio of preview events of a particular advertisement to selections of the advertisement and/or a ratio of selections of the advertisement to the number of preview events of the advertisement.

Additional example methods, apparatus, and articles of manufacture disclosed herein modify an ordering of search results generated by a search engine based on a preview metric. In some examples, a search result orderer receives a listing of search results based on a search query, accesses a database of preview data for the search results in the listing, and orders (or reorders) the search results based on the preview data. In some examples, the search result orderer uses data in addition to the preview data.

FIG. 1 is a schematic diagram of an example system 100 to perform a web search. The system 100 includes a plurality of computers 102, 104 capable of accessing a network 106 (e.g., the Internet). As described in more detail below, the computers 102, 104 may be included in an audience measurement panel to measure, among other things, search engine effectiveness. In the illustrated example of FIG. 1, the computers 102, 104 are general-purpose personal computers that may be used to access different web sites A-D 108a-108d and/or web pages, perform searches, exchange data, etc.

The example computer 102 shown in FIG. 1 includes an operating system 110 to manage the system resources of the computer 102. A user of the computer 102 interacts with applications executed by the computer 102, such as a web browser 112, to send and/or receive information via the network 106. The web browser 112 of the illustrated example interacts with the operating system 110 to access the network 106. To measure the activities of a user on the computer 102 (e.g., media presented on the computer 102, web sites visited on the computer 102, web searches performed on the computer 102, data input by the user search as URL's, search terms, etc.), the example computer 102 of FIG. 1 also includes a monitor 114. The example monitor 114 may be implemented as a layer (e.g., an application, a proxy, a wrapper, a service, etc.) between the web browser 112 and the operating system 110 to transparently and/or non-transparently monitor interactions (e.g., user interactions) with the web browser 112, the information sent to and/or received from the network 106, and/or other events (e.g., operating system events, system calls, etc.) that are indicative of user activities that may be monitored to measure computer use.

In the example of FIG. 1, a search engine 116 is implemented by one or more server(s) communicatively coupled to the network 106. The search engine 116 develops and maintains a search index of web sites available on the Internet (e.g., the web sites A-D 108a-108d). The computers 102, 104 may selectively access the search engine 116 to perform searches (e.g., keyword searches). On receiving a search request from a computer 102, 104, the search engine 116 develops a listing of search results corresponding to keywords and/or search connectors (e.g., AND, OR, NOT, etc.) in the search request, and returns the listing of search results to the requesting computer 102, 104. The example search results are provided in a format that may be interpreted and rendered by the web browser 112 for viewing by a user (e.g., the requester). Web page document formats may include HTML, JavaScript, Extensible Markup Language (XML), Cascading Style Sheets (CSS), and/or other web document formats, scripts, and/or languages. Different search engine algorithms are known and may be used to develop a set of search results from a search query.

Figure 4A:
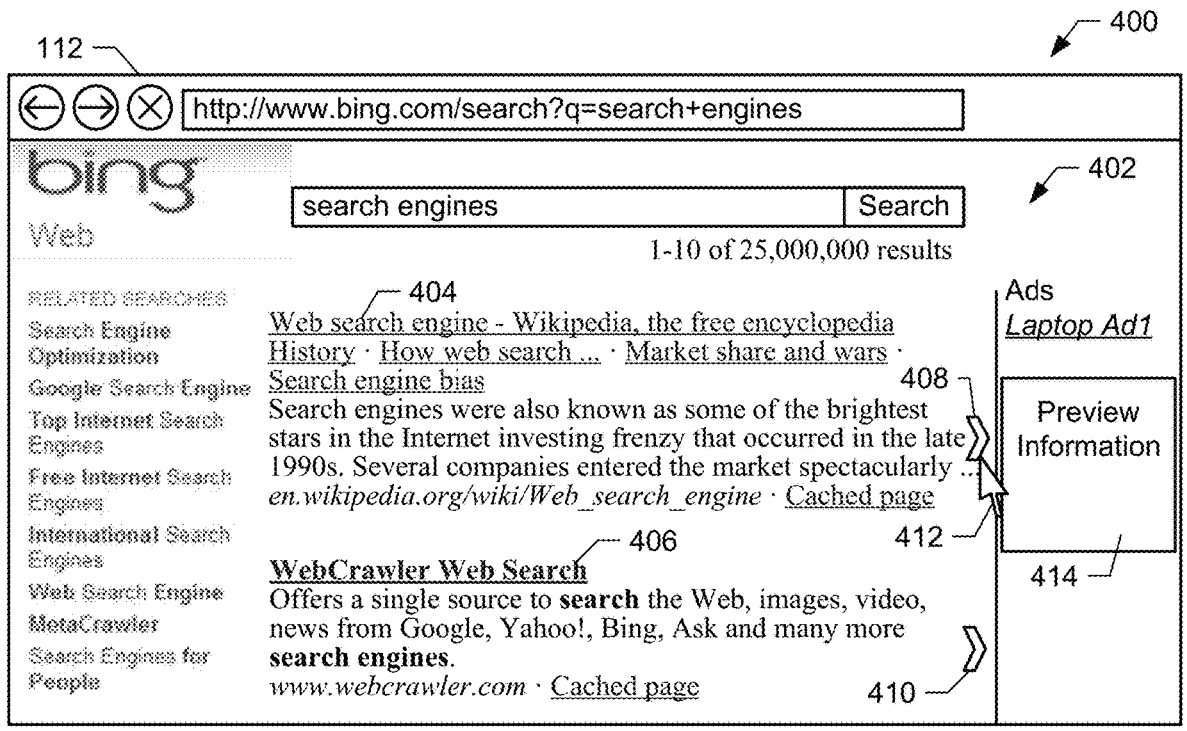
FIGS. 4A and 4B illustrate example preview events that may be monitored by the example monitor of FIG. 2.
Figure 4B:
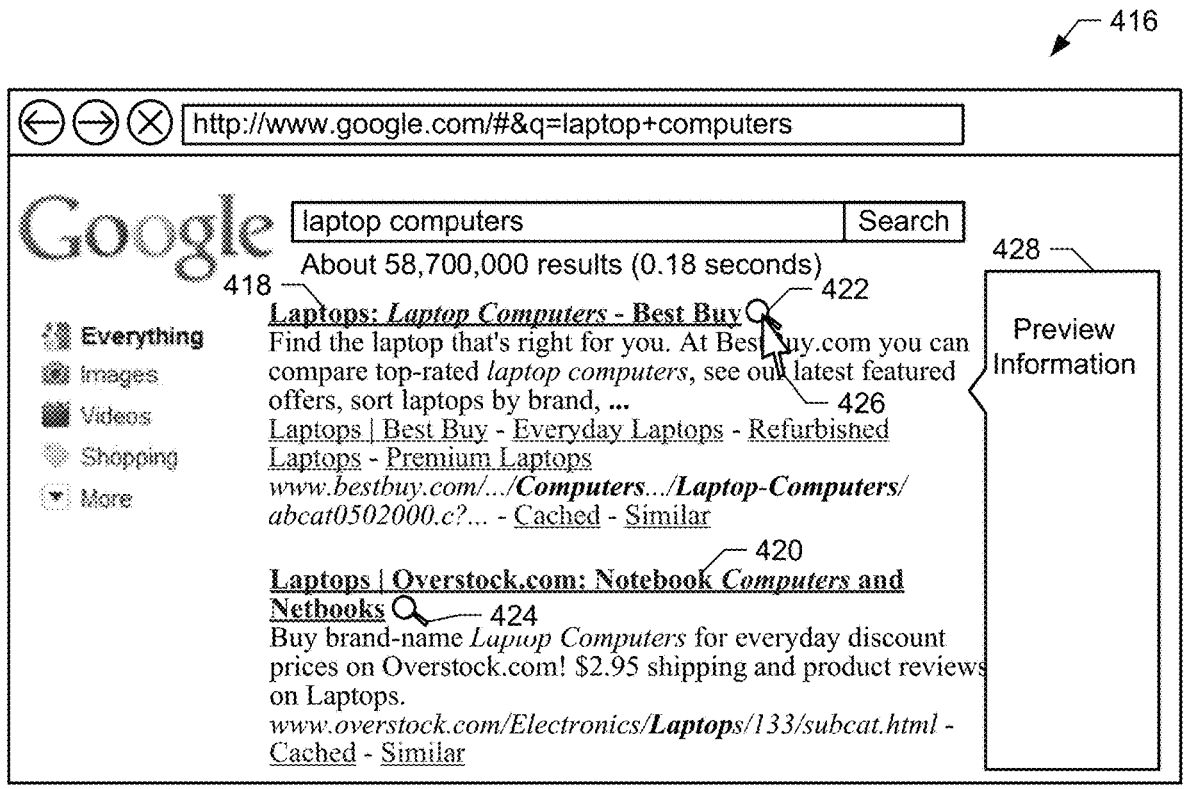

Some search engines, such as the example search engine 116 of FIG. 1 provide the capability to quickly preview the search results in a web browser without navigating away from the web page listing the search results. To provide this capability, the example search engine 116 provides additional preview code (e.g., JavaScript code) in the search results document. After or when the web browser 112 renders the search results document to present the search results to a user, the web browser 112 also interprets and/or renders the additional preview code. In some examples, the preview code results in the web browser 112 displaying a visual icon or marker. When the user interacts with the icon (e.g., hovers a cursor over the icon, mouses over the icon, selects the icon, etc.), the example web browser 112 requests and/or renders a preview for the corresponding search result. Example previews are illustrated in FIGS. 4A and 4B and described below.

The example monitor 114 of FIG. 1 identifies the preview request from the browser 112 and stores the preview request as a preview event, also referred to herein as a "hover-through," in a monitor storage 118. As the user previews additional search results, the example monitor 114 stores corresponding preview events for those previews. If, after viewing one or more previews of search results, the user selects one of the search results (e.g., clicks a link to the web site A 108a from the listing of search results received from the search engine 116 either by clicking on the link or the preview), the example web browser 112 of FIG. 1 sends a request to the web site A 108a. The web site A 108a responds to the request with a web page (e.g., HTML, JavaScript, Java, and/or some other scripting language) that is received by the web browser 112. The monitor 114 of the illustrated example identifies the request and stores the selection of the search result in the monitor storage 118. The preview events and the search results storage may be stored in association with other information such as the identity of the user, the demographics of the user, a timestamp duration representing time spent with the search results, the search result listing, the preview(s), etc.

The example monitor 114 periodically or aperiodically reports the data stored in the monitor storage to a central data processing facility 120 via the network 106. For example, the monitor 114 may report the number of impressions, the number of preview events (e.g., hover-throughs), and/or the number of selections (e.g., clicks) for each of the web sites A-D 108a-108d. The example monitor 114 may also request more detailed information such as time spent in search activities, search terms, search results, identit(ies) of search results subjected to previews and/or identit(ies) of search results selected (e.g., clicked). The example central data processing facility 120 receives similar data from other monitors coupled to the network 106. Collectively, the data from the monitors (including the monitor 114) of the illustrated example forms panel measurement data that quantifies the hover-throughs or preview events for the web sites A-D 108a-108d that result from web searches.

In the illustrated example, panelists are selected to be generally reflective of one or more population(s) whose computer and/or online habits are of interest. Panelists may be selected and/or recruited in any desired manner. In some examples, panelists are statistically selected to represent one or more specific populations. The panelists may provide demographic information data (e.g., gender, race, religion, income, education level, etc.) to facilitate correlating detected behaviors to demographic populations.

The example central data processing facility 120 also determines a hover-through-rate (HTR), or preview rate, by determining the ratio of preview events to impressions. As used herein, an impression refers to an exposure count of a user to a given advertisement. For example, if a web site is displayed in a listing of search results 10 times over the course of a measurement period (i.e., 10 impressions) and the web site is previewed 4 times, the web site has a HTR of 0.40 (i.e., 4/10=0.40). The example central data processing facility 120 also determines a hover-to-click (HTC) metric, which represents the ratio of hover-throughs of a search result that result in selections of the search result. The HTC may be determined by, for example, determining the ratio of hover-throughs to selections of the search results.

Using the HTR, the example central data processing facility 120 of FIG. 1 assigns the relative values of the web sites A-D 108*a*-108*d* (e.g., relative to the search query terms, in general, or both). The search engine 116 may use this data to advantageously adjust its search result ordering. For example, if the central data processing facility 120 determines, based on the panel measurement data, that the web site D 108*b* has a higher HTR than the web sites B and C 108*b*, 108*c* (e.g., in general, for one or more particular search terms, or both), the central data processing facility 120 may suggest (e.g., via a report) that the search engine 116 place the web site D 108*d* higher than the web sites B and C 108*b*, 108*c* in future listings of search results.

The central data processing facility 120 may also use other data to determine, adjust, and/or suggest adjustments to a search result ordering. For example, the central data processing facility 120 may determine that the web site A 108*a* has a high HTR but a low selection rate (e.g., by examining click-through rate, a ratio of selections to impressions, a ratio of selections to preview events, etc.). The search engine 116 may then determine that the web site A 108*a* should be presented later in future listings of search results. Additional example data processing methods and results are described in more detail below.

In an example of monitoring a user interaction with the search engine 116 from the computer 102, a user opens the web browser 112. The monitor 114 identifies that the web browser 112 was opened and may store the action (e.g., in the monitor storage 118). To perform a search, the user navigates to (e.g., sends a request for and renders) a search engine web site (e.g., Google, Bing, etc.) using the browser 112. The monitor 114 of the illustrated example identifies and stores the navigation action by identifying the request from the browser 112 to the search engine 116. This request can be identified by monitoring operating system events, snooping communications to the Internet, monitoring keystrokes, etc. The user enters a desired search query into the search engine web page via the browser 112 and submits the search query to the search engine 116. The example monitor 114 identifies and stores the search query (e.g., in the monitor storage 118), including the keywords, by monitoring the request from the browser 112. The search query can be identified by monitoring operating system events, snooping communications to the Internet, monitoring keystrokes, etc.

The search engine 116 processes the search query and returns a listing of search results (e.g., in a web page). The monitor 114 of the illustrated example identifies each of the search results from the listing of search results. For example, the monitor 114 may parse the HTML, JavaScript, and/or other instructions included in the web page provided by the search engine 116 to identify the web pages A-D 108*a*-108*d* included in the search results. For each of the example web pages A-D 108*a*-108*d* included in the search results, the monitor 114 stores an impression. In some examples, the monitor 114 determines whether each of the search results is actually displayed to the user (e.g., on-screen) before storing impressions for the search results, and stores impressions for only those search results that are displayed to the user. Techniques for monitoring user interaction with web pages and/or determining if content is actually displayed are disclosed in Blumenau, U.S. Pat. No. 6,108,637 and Coffey, U.S. Pat. No. 5,675,510, both of which are hereby incorporated herein by reference.

The user views the displayed search results and, in this example, hovers his cursor over a first search result. The code in the example search results page causes the web browser 112 to request a preview image of the first search result in response to the cursor hover. While the code in this example instructs the web browser 112 to direct the preview image request to the search engine 116, the code may additionally or alternatively instruct the browser to direct the preview image request directly to a server associated with a search result being targeted and/or to a third server that serves preview requests. The monitor 114 identifies the preview request sent by the web browser 112 and stores a preview event corresponding to the requested preview in the monitor storage 118.

When the web browser 112 receives the preview, the browser 112 displays the preview to the user. In some examples, the browser 112 caches the preview image so that if the user stops hovering over the search result at a first time and then hovers over the search result again at a second time after the first time, the web browser 112 does not need to make another preview request. The monitor 114 may store a preview event for multiple hovers over the same search result, or may store one preview event the first time the user hovers over a given search result, depending on the methodology used to track previews. The user may decide to preview additional search results before (or without) selecting a search result. As the user previews additional search results (i.e., different search results or the same result multiple times), the web browser 112 generates additional preview requests and the monitor 114 of the illustrated example identifies and stores the preview events in the monitor storage 118.

After viewing the preview, the user may decide that he is interested in viewing the search result and select (e.g., click on) the search result in the web browser 112. In such circumstances, the browser 112 requests the web site corresponding to the selected search result. The monitor 114 identifies the request for the web site and stores a selection event for the search result (e.g., the web site) in the monitor storage. Additionally, the user may decide to return to the search results after viewing the web site of the selected search result by using the "back" function available in many web browsers. The back function returns the user to a previously-presented web site in the user's browsing history. In some examples, the user may search the same query to return to the listing of search results. The monitor 114 may recognize that the user returned to the search results and continue to monitor the user's activities with the website. In some examples, the monitor 114 may treat the user's return to the web site as an extension of the previous search results instead of treating the return as a new search query (irrespective of whether the search query is resubmitted through a search form), in which case the monitor 114 does not add additional impressions for the search results. On the other hand, the monitor 114 may treat the return to the listing of search results as a new search and increment the impressions of the listed search results in the monitor storage 118 accordingly. As mentioned above, storing preview events, searches, and/or selection events may involve storing timestamp(s) reflecting the occurrence(s) and/or duration(s) of the corresponding event(s).

Although two monitored computers 102, 104, four web sites 108*a*, 108*b*, 108*c*, 108*d*, one search engine 116, one network 106, and one central facility 120 are shown in the example of FIG. 1, the system 100 may include any number of these elements (e.g., fewer or more than those shown in FIG. 1).

Figure 2:
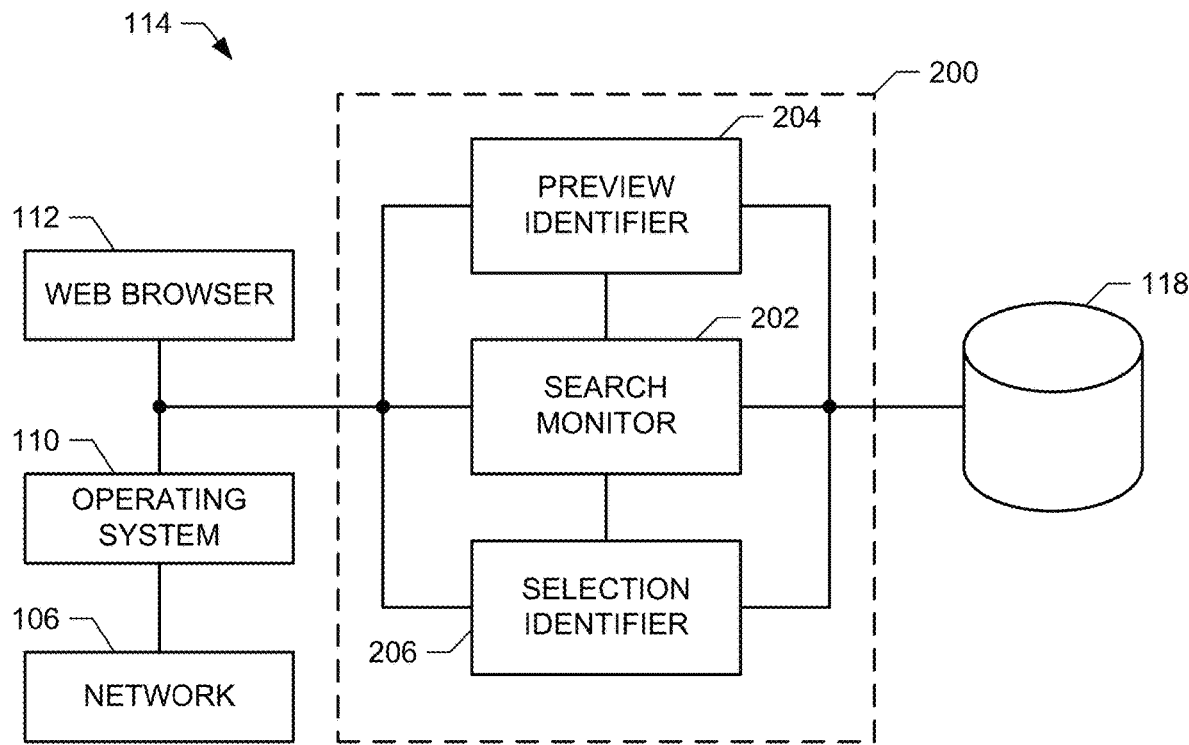
FIG. 2 is a block diagram of an example implementation of the monitor illustrated in FIG. 1.

FIG. 2 is a block diagram of an example monitor 200 to implement the monitor 114 illustrated in FIG. 1. The monitor 200 illustrated in FIG. 2 includes a search monitor 202, a preview identifier 204, and a selection identifier 206. The example monitor 200 monitors exchanges of data and/or data requests between the web browser 112 (and other applications) and the operating system 110 to gather data about a user's activities on a computer (e.g., the computer 102 of FIG. 1). In the illustrated example of FIG. 2, each of the search monitor 202, the preview identifier 204, and the selection identifier 206 receive and/or process the data exchanges and/or requests between the operating system 110 and the web browser 112 by "snooping" or otherwise listening for communications between the same. However, in some other examples the monitor 200 may be implemented as a layer that intercepts data exchanges between the operating system 110 and the web browser 112, processes the data, and forwards the data to the intended receiver (e.g., the operating system 110 or the web browser 112).

The example search monitor 202 of FIG. 2 receives data sent from the web browser 112 to the operating system 110 (e.g., search requests to the example search engine 116 of FIG. 1) and from the operating system 110 to the web browser (e.g., listings of search results from the search engine 116). The search monitor 202 of the illustrated example is capable of parsing the information in the search request (e.g., a Hypertext Transfer Protocol (HTTP) request) to determine the search query. The search monitor 202 is also capable of parsing the response from the search engine (e.g., an HTTP response, an HTML and/or JavaScript payload) to determine which web sites (e.g., the web sites 108a-108d of FIG. 1) have been included in the listing of search results. Based on the response, the example search monitor 202 logs an impression for each of the web sites 108a-108d included in the search results. The impression may be logged in association with the search terms (e.g., in the query) that resulted in the impression and/or in association with a timestamp reflecting a date and/or a time of the impression.

The example preview identifier 204 of FIG. 2 also monitors data and/or requests transferred between the operating system 110 and the web browser 112. In particular, the example preview identifier 204 monitors for preview events requested by the user via the web browser 112.

The example selection identifier 206 monitors data and/or requests transferred between the operating system 110 and the web browser 112. For example, the selection identifier 206 may begin monitoring in response to receiving an indication from the search monitor 202 that search results were received by the web browser 112. The selection identifier 206 of the illustrated example monitors to determine whether the user has selected a search result from a listing of search results. The selection of a search result causes the web browser 112 to request a web site (e.g., via an HTTP request).

The example selection identifier 206 identifies the request and parses the request to determine the requested web site. Because the web browser 112 generates HTTP requests for different activities by the user, the example selection identifier 206 compares the requested web site (e.g., determined from the HTTP request) to the listing of search results previously identified by the search monitor 202 (e.g., in the most recent search). If the requested web site is in the listing of search results, the selection identifier 206 determines that the user selected the requested web site from the listing of search results, and stores the selection in the monitor storage 118. On the other hand, if the requested web site is not in the listing of search results, the example selection identifier 206 determines that the user entered the URL of another web site and did not make a selection from the listing of search results. The selection of a web site not in the search results may likewise be logged and timestamped as it provides information about the relevancy or lack thereof of the search. For example, the request from outside the search results may be a navigation to a second search engine different from the engine that was used for the prior search.

While the illustrated example apparatus 200 of FIG. 2 is shown as snooping communications between the operating system 110 and the web browser 112, the example apparatus 200 may additionally or alternatively be implemented as a wrapper for the web browser 112, through which communications between the web browser 112 and the operating system 110 are directed and then forwarded to their respective destinations.

Figure 3:
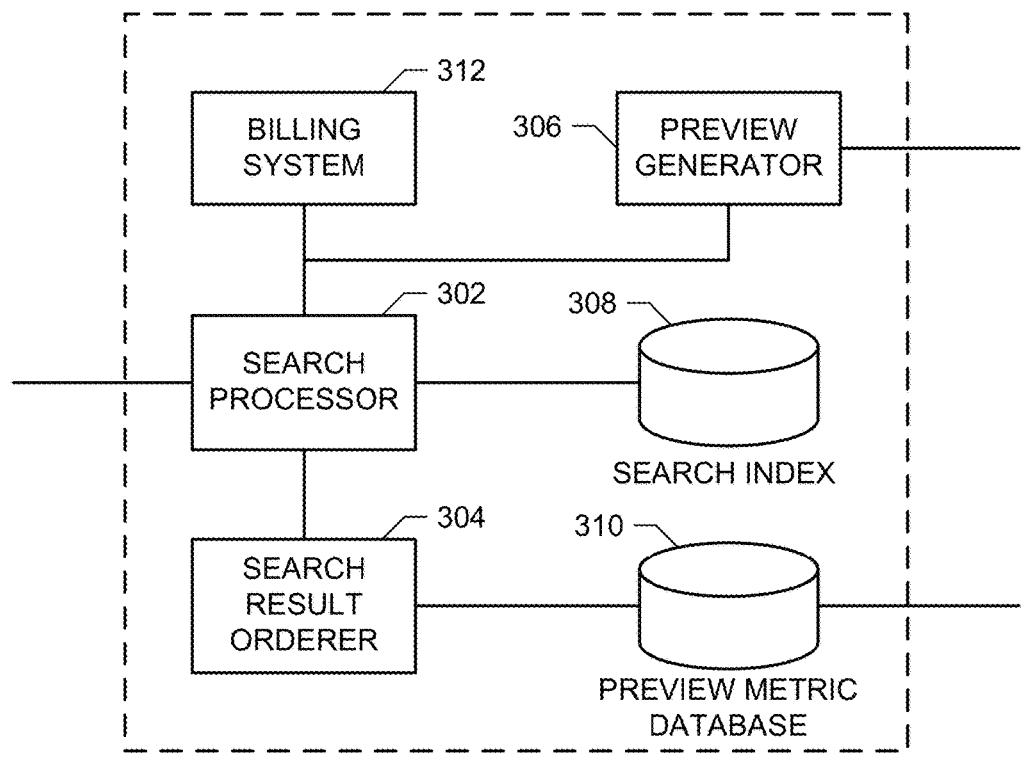
FIG. 3 is a block diagram of an example implementation of the example search engine illustrated in FIG. 1.

FIG. 3 is a block diagram of an example search engine 300 to implement the search engine 116 illustrated in FIG. 1. The example search engine 300 of FIG. 3 includes a search processor 302, a search result orderer 304, a preview generator 306, a search index 308, a preview metric database 310, and a billing system 312. In general, the search engine 300 illustrated in FIG. 3 indexes web sites (e.g., the web sites 108a-108d of FIG. 1), receives search requests from clients via a network (e.g., the network 106 of FIG. 1), provides search results in response to received search requests, receives requests for previews of web sites listed in the search results, provides previews of web sites listed in search results in response to requests for previews, and orders search results based on previews.

The example search processor 302 of FIG. 3 receives search requests (e.g., keyword queries), processes the search requests using web site data in the search index 308, and generates listings of search results to provide the requester with web sites and/or information that is relevant to the search request. For example, when the search processor 302 receives a search request (e.g., in HTTP format), the search processor 302 parses the search request to determine the keyword(s) that are used to define the search. In some examples, the search processor 302 further determines other information regarding the search, such as Boolean operators, search options and/or presentation options requested by the user, user identifying information that may further define the search, and/or other feature information that the search processor 302 may support.

To process search requests, the search processor 302 of FIG. 3 accesses the search index 308. The example search index 308 is a database designed to increase the speed with which information is accessed based on keywords and/or other search criteria. The example search processor 302 parses the search request and queries the search index 308 based on the resulting search query. The example search index 308 returns a set of search results (e.g., in the form of documents, locations, web sites, etc.) to the search processor 302.

Due to the large number of web sites on the Internet, because many web sites have overlapping and/or related subject matter, and/or because many web sites have multiple versions over time, typical user search queries often produce a high volume of results. To avoid having the user scan through large volumes of search results to find the information that he or she is looking for, the example search processor 302 orders the listing of search results received from the search index 308 to display information to the user that is more likely to be highly useful or relevant before showing information that is less likely to be useful or relevant.

Known listings of search results are often ordered according to, for example, keyword relevancy, absolute and/or recent popularity by users of the network 106, pricing models, and/or other factors. By contrast, the example search engine 300 of FIG. 3 includes a search result orderer 304 that orders the search results based, at least in part, on preview metrics of the search results. To order the listing of search results, the example search result orderer 304 accesses the preview metric database 310 to retrieve preview metrics for the web sites identified in the search results developed for a given query. The example preview metric database 310 is populated by an external preview metric measurement system, such as the central data processing facility 120 of FIG. 1.

The example central data processing facility 120 of FIG. 1 receives preview events from the example computers 102, 104 corresponding to a panel, determines preview metrics based on the preview events, and provides the preview metrics to the preview metric database 310. The central data processing facility 120 of the illustrated example further updates the preview metrics as additional preview events are received and/or changes in user preview patterns occur. In some examples, the central data processing facility 120 provides the preview metrics and/or updates the metrics according to a service contract between the operator of the central data processing facility 120 (e.g., a search measurement or other organization) and the operator of the search engine 300 (e.g., a search provider).

Based on the preview metrics for the search results, the example search result orderer 304 provides a re-ordered listing (which may or may not be identical to the initial listing generated by the search processor 302) to the search processor 302. In some examples, the search result orderer 304 may order the search results based on the preview metrics and any other factor including, but not limited to, fee structure(s), user search histor(ies), user preference(s), and/or page rank(s).

The example search engine 300 of FIG. 3 further includes a billing system 312 to bill owners of websites according to pre-arranged fee structures. For example, owners of websites that have subscribed to a pay-per-hover pricing system are billed based on a number of preview events (e.g., hover-throughs) that occur during a particular time frame (e.g., a billing period). The search processor 302 and/or the preview generator 304 may provide preview event information to the billing system 312 to perform appropriate billing.

FIG. 4A illustrates an example preview event 400 that may be monitored by the example monitor 114 of FIG. 1. The example preview event 400 may be performed in a web browser (e.g., the web browser 112 of FIG. 1), which displays a web page 402 including search results 404, 406 (shown using the commercial search engine Bing™). Each of the example web pages 404, 406 listed in the search results includes a preview icon 408, 410 which, when hovered over by a cursor 412 (e.g., by using a mouse or other pointing device) controlled by the user, displays a preview window 414 that includes preview information for the corresponding search result (i.e, web page that appears in a listing of search results). In the illustrated example, the cursor 412 is shown hovering over the preview icon 408 for the first search result 404, which causes the preview window 414 to appear and provide additional information. In some examples, the preview event may be triggered by selecting (e.g., clicking) the preview icon 408, 410 and/or by hovering the cursor 412 over the general area of the corresponding search result 404, 406.

FIG. 4B illustrates another example preview event 416 that may be monitored by the example monitor 114 of FIG. 1. Like the preview event 400, the illustrated preview event 416 includes web pages 418, 420 listed as search results. Each listed page 418, 420 has an associated preview icon 422, 424. When a cursor 426 controlled by the user hovers over the preview icon 422, 424, a preview window 428 appears and provides additional information about the corresponding search result (e.g., a preview of a web page).

While the example preview events 400 and 416 of FIGS. 4A and 4B show each of the search results 404, 406, 418, 420 having corresponding preview icons, one or more of the search results 404, 406, 418, 420 may not have corresponding preview icon(s). For example, search results for videos, news articles, shopping results, and/or other types of web pages, may not include a preview. Further, a web site may include commands (e.g., metadata, flags, executable instructions, etc.) instructing a search engine to not construct a preview of that web site. In such a case, the search engine may not provide a preview icon or a preview window for that particular search result.

FIG. 5 is a table 500 including example preview information that may be collected by a monitor (e.g., the monitors 114, 200 of FIGS. 1 and 2). The table 500 and/or the preview information may additionally or alternatively be used to implement a database at a central data processing facility (e.g., the central data processing facility 120 of FIG. 1). The example table 500 is discussed below with reference to the example monitor 200 of FIG. 2.

In the example illustrated in FIG. 5, the example table 500 includes a search engine field 502, a web site field 504, an impressions field 506, a preview events field 508, a selections field 510, and an average search result position field 512. The search engine field 502 of the example table 500 records the name of the search engine (e.g., the search engine 116 of FIG. 1) that returns a particular web site (e.g., the web sites A-D 118a-118d of FIG. 1) in a listing of search results. The monitor 114 determines the search engine 116 that is used by a user to search a particular query and populates the search engine field 502 with the determined search engine 116 when the monitor 114 stores impression, preview event, and/or search result selection information. This determination can be done by monitoring HTTP requests for the addresses of search engine(s) to be monitored.

The web site field 504 of the example table 500 stores the IP addresses of the web sites A-D 118a-118d that appear in the search results. As illustrated in the example table 500, the web sites A-D 118a-118d may be included in a duplicative manner because different search engines may be used to search for the same queries, which may return similar and/or identical listings of web sites. In some examples, however, the table 500 does not store the search engine field 502 and is agnostic to the search engine used to produce the web sites 118a-118d in the search results.

In some examples, a single IP address is used to log the impressions for all web pages within the corresponding web site. For example, the entry for the web site A 118a (e.g., www.WebSiteA.com) in the web site field 504 may include the individual web pages <www.WebSiteA.com/HomePage> and <www.WebSiteA.com/SecondPage>. In such a case, the impressions field 506, the preview events field 508, and the selections field 510 would include the respective sums of the impressions, preview events, and selections for both of the individual web pages of the example web site A 118a. This organization of the web sites in the web site field 504 advantageously emphasizes the value of particular web sites, without providing as much measurement granularity or recognizing that one web page on a web site may be more relevant to its respective topic than another page on the web site is relevant to its topic. In some other examples, each web site in the web site field 504 reflects an individual web page such that different web pages belonging to the same web site (e.g., a collection of related web pages) are listed in separate entries in the web site field 504 if those pages appear separately in the search results and/or if a user follows links to those pages from a search result listing of another page (e.g., from a home page).

The impressions field 506 of the example table 500 of FIG. 5 includes the sum of the impressions of each web site listed in the web site field 504 resulting from the respective search engines listed in the search engine field 502. For example, each of the web sites A-D 118*a*-118*d* has 10 impressions from the Google™ search engine. The preview events field 508 of the example table 500 includes the sum of the preview events (e.g., hover-throughs) for each web site listed in the web site field 504 resulting from the respective search engines listed in the search engine field 502. In some examples, the preview events field 508 includes each hover-through (e.g., each time a user mouses over the corresponding search result, even if there are multiple hover-throughs on the same search result for the same search request). In some other examples the preview events field 508 includes only the first hover-through (e.g., the preview event request and response between the web browser 112 and the search engine 116 of FIG. 1) for each search request. The example selections field 510 includes the number of selections of the corresponding search result (e.g., the number of times a search result was clicked on, which caused the web page of the search result to load).

The average search result position 512 of the example table 500 field stores the respective average positions in listings of search results for the web sites in the web site field 504. The average search result position 512 may advantageously be used to determine whether hover-throughs and/or selections of search results are skewed based on the average search result positions and adjust the search result positions (and/or charge fees for positions) accordingly. For example, if a web site (e.g., the web site C 118*c*) has a lower position and a relatively high number of hover-throughs and/or selections, the central data processing facility 120 may determine that the web site C 118*c* has a high value compared to the web site B 118*b*. The determination is provided to a subscribing search engine (e.g., the search engine 116), which may use the information to move the web site C 118*c* higher in future listings of search results. In the illustrated example of FIG. 5, a lower number is a higher position (e.g., 1 is first in search listings, 2 is second, etc.) and the average position is rounded to the nearest position (e.g., 1.2 to 1, 1.9 to 2, etc.).

The example monitor 114 of FIG. 1 determines the average search result position by assigning points or scores to the web sites in the web site field 504 corresponding to positions in listings of search results each time there is an impression, and then dividing the sum total score by the respective number of impressions. However, other methods of determining an average search result position may additionally or alternatively be used.

Figure 6:
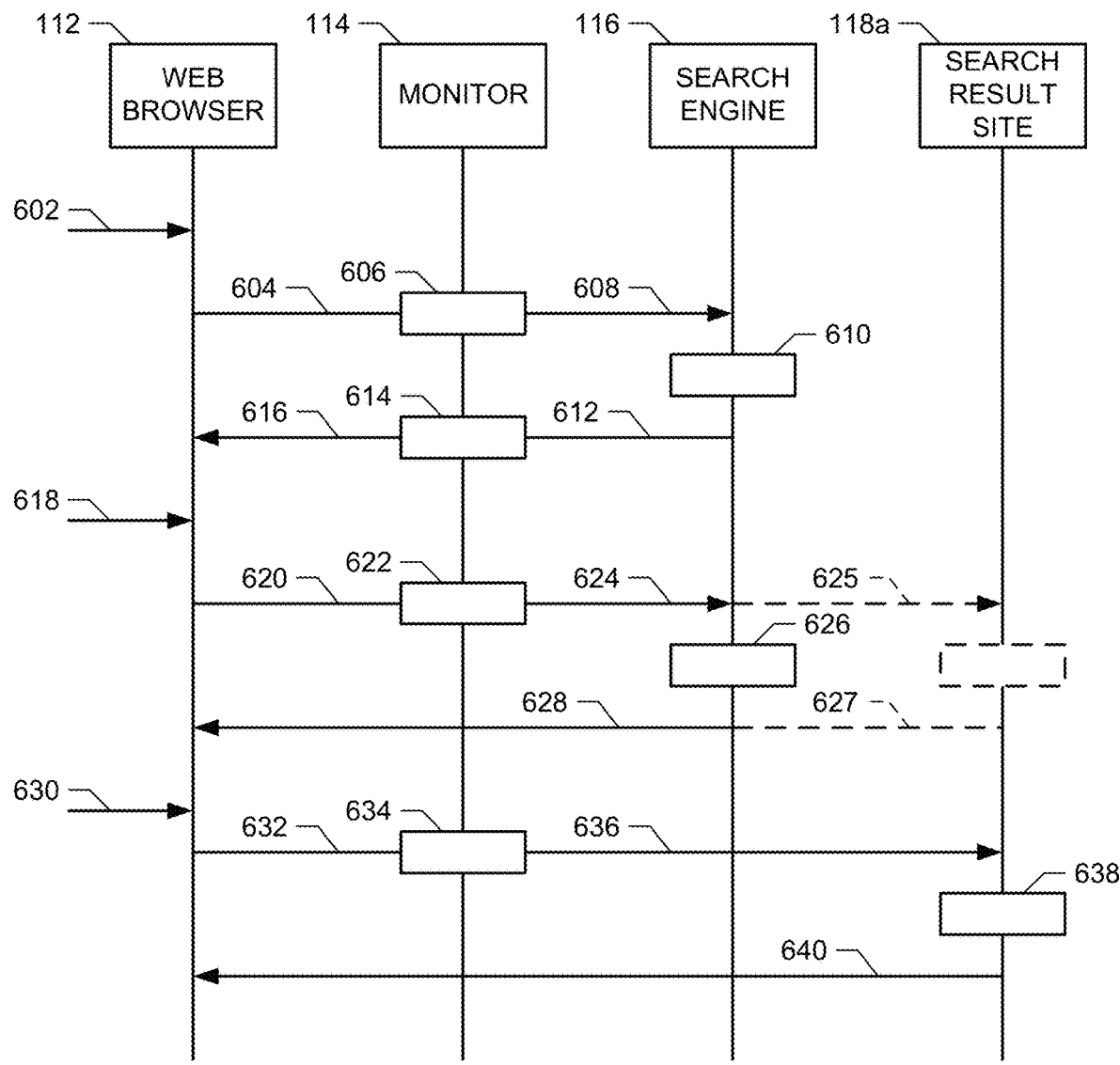
FIG. 6 is a flowchart representative of an example communication flow to monitor a preview event.

FIG. 6 is a flowchart representative of an example communication flow 600 to monitor a preview event. The example communication flow 600 includes communications sent between the example web browser 112, the example monitor 114, the example search engine 116, and the example web site 118*a* of FIG. 1.

The example communication flow 600 begins with a user entering a search request 602 into the web browser 112. The user may enter the example search request 602 by entering a search query into a web page provided by the search engine 116 and loaded in the web browser 112. The user then submits the search query by pushing a "Search" button on the search web page. However, other methods of submitting a search may be used, such as entering a search query into a web browser search tool. Upon receiving the search request, the web browser 112 constructs and transmits 604 the search request (e.g., an HTTP request) to a search engine (e.g., the search engine 116 of FIG. 1). The choice of search engine may depend on the method with which the user entered the search query into the web browser 112.

The example monitor 114 of FIG. 1 snoops 606 the search request 604 between the web browser 112 and the search engine 116. In some examples, the monitor 114 copies the search request 604, and parses the copy while the original search request 604 generated by the web browser 112 is transmitted to the search engine 116. In some other examples, the monitor 114 receives the search request 604, parses the search request 604, constructs a new search request 608 to be forwarded to the search engine 116, and forwards the new search request 608. The monitor 114 may construct the new search request 608 if, for example, the monitor 114 is to receive the search results directly from the search engine 116.

The search engine 116 receives the example search request 608 (or 604) and processes 610 the search request to generate a listing of search results. The search engine 116 further constructs a search result message (e.g., an HTTP response) to include the search results listing and transmits 612 the listing of search results to the web browser 112. The example monitor 114 snoops 614 the search results 612 to determine impressions for the web sites listed in the search results 612. When parsing the listing of search results 612, the example monitor 114 stores an impression for each of the web sites and/or web pages listed in the search results 612. As with the search request 604, the example monitor 114 may simply copy the search results 612 and parse the copy, or the monitor 114 may receive the listing of search results 612, parse the search results 612, and construct another message 616 to be provided to the web browser 112. The web browser 112 receives the listing of search results 612, 616 (e.g., in an HTTP response format, in HTML, in JavaScript document format, and/or in any other past, present or future format) and displays the search results to the user.

After the user reviews the search results 612, 616, the user may decide to preview one or more of the web sites listed in the search results 612, 616. When the user hovers 618 over a preview icon for a search result web site, the web browser 112 sends a preview request 620. The preview request 620 is generally based on instructions included in the example search results 612, 616 (e.g., JavaScript in an HTML document). In some examples, the instructions cause the web browser 112 to send the preview request 620 to the search engine 116. In other examples the instructions cause the web browser 112 to send the preview request 620 to the web site 118*a* of which a preview is being requested (as illustrated in FIG. 6 by the dashed lines 625, 627). The following example will be described as transmitting the preview request 624 to the search engine 116.

The monitor 114 snoops 622 the preview request 620. As with the search request 604, the monitor 114 may copy the preview request 620 or may receive the preview request 620 and construct another preview request 624 for transmission to the search engine 116 and/or the web site 118*a*. The monitor 114 parses the preview request 620 and creates (in the case of a first impression) or increments a preview event count corresponding to the previewed web page in monitor storage (e.g., in the example monitor storage 118 of FIG. 1, in the preview event field 508 of FIG. 5).

When the search engine 116 receives the preview request 620, 624, the search engine 116 prepares 626 a preview image and/or other preview data for transmission to the web browser 112. The search engine 116 sends 628 the preview image to the web browser 112, which is displayed to the user. The example communications 618-628 may occur multiple times if, for example, the user hovers over multiple search results before making (or not making) a selection.

When the user selects (e.g., clicks on a search result), the web browser 112 receives the selection 630. In response, the web browser 112 prepares and sends a request 632 (e.g., an HTTP request message) for transmission to the web site A 118a corresponding to and/or represented by the search result. The monitor 114 also snoops 634 the request 632 and determines whether the request 632 is a selection of one of the search results received from the search engine 116. Assuming, for purposes of illustration, that the selection is for one of the search results, the example monitor 114 stores the selection in the monitor storage 118 (e.g., in the example selections field 510 of FIG. 5). As with the search request 604 and/or the preview request 620, the example monitor 114 may copy the request 632 and parse the copy, or may receive and parse the request 632, construct another request 636 for the web site A 118a, and transmit the newly constructed request 636 to the web site A 118a.

The web site A 118a receives the request 632, 636 and generates 638 a response to provide the document requested by the browser 112. The web site A 118a then returns 640 the requested document (e.g., an HTML document, an HTTP response, etc.) to the browser 112, which renders and displays the document to the user. The example communications 630-640 may occur multiple times if, for example, a user requests multiple web sites based on the search results.

While example manners of implementing the monitor 114 and the search engine 116 of FIG. 1 have been illustrated in FIGS. 1-3, one or more of the elements, processes and/or devices illustrated in FIGS. 1-3 may be combined, divided, re-arranged, omitted, eliminated and/or implemented in any other way. Further, the example monitored computer(s) 102, 104, the example search engine 116, the example central data processing facility 120, the example search monitor 202, the example preview identifier 204, the example selection identifier 206, the example search processor 302, the example search result orderer 304, the example preview generator 306, the example search index 308, the example preview metric database 310, the example billing system 312 and/or, more generally, the example monitor 114, 200 and/or the example search engine 116, 300 of FIGS. 1-3 may be implemented by hardware, software, firmware and/or any combination of hardware, software and/or firmware. Thus, for example, any of the example search monitor 202, the example preview identifier 204, the example selection identifier 206, the example search processor 302, the example search result orderer 304, the example preview generator 306, the example search index 308, the example preview metric database 310, the example billing system 312 and/or, more generally, the example monitor 114, 200 and/or the example search engine 116, 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of the patent are read to cover a purely software and/or firmware implementation, at least one of the example moni-tored computer(s) 102, 104, the example search engine 116, the example central data processing facility 120, the example search monitor 202, the example preview identifier 204, the example selection identifier 206, the example search processor 302, the example search result orderer 304, the example preview generator 306, the example search index 308, the example preview metric database 310, the example billing system 312, the example monitor 200 and/or the example search engine 300 are hereby expressly defined to include a computer readable medium such as a memory, DVD, CD, etc. storing the software and/or firmware. Further still, the example monitor 114, 200 and/or the example search engine 116, 300 of FIGS. 1-3 may include one or more elements, processes and/or devices in addition to, or instead of, those illustrated in FIGS. 1-3, and/or may include more than one of any or all of the illustrated elements, processes and devices.

Figure 7:
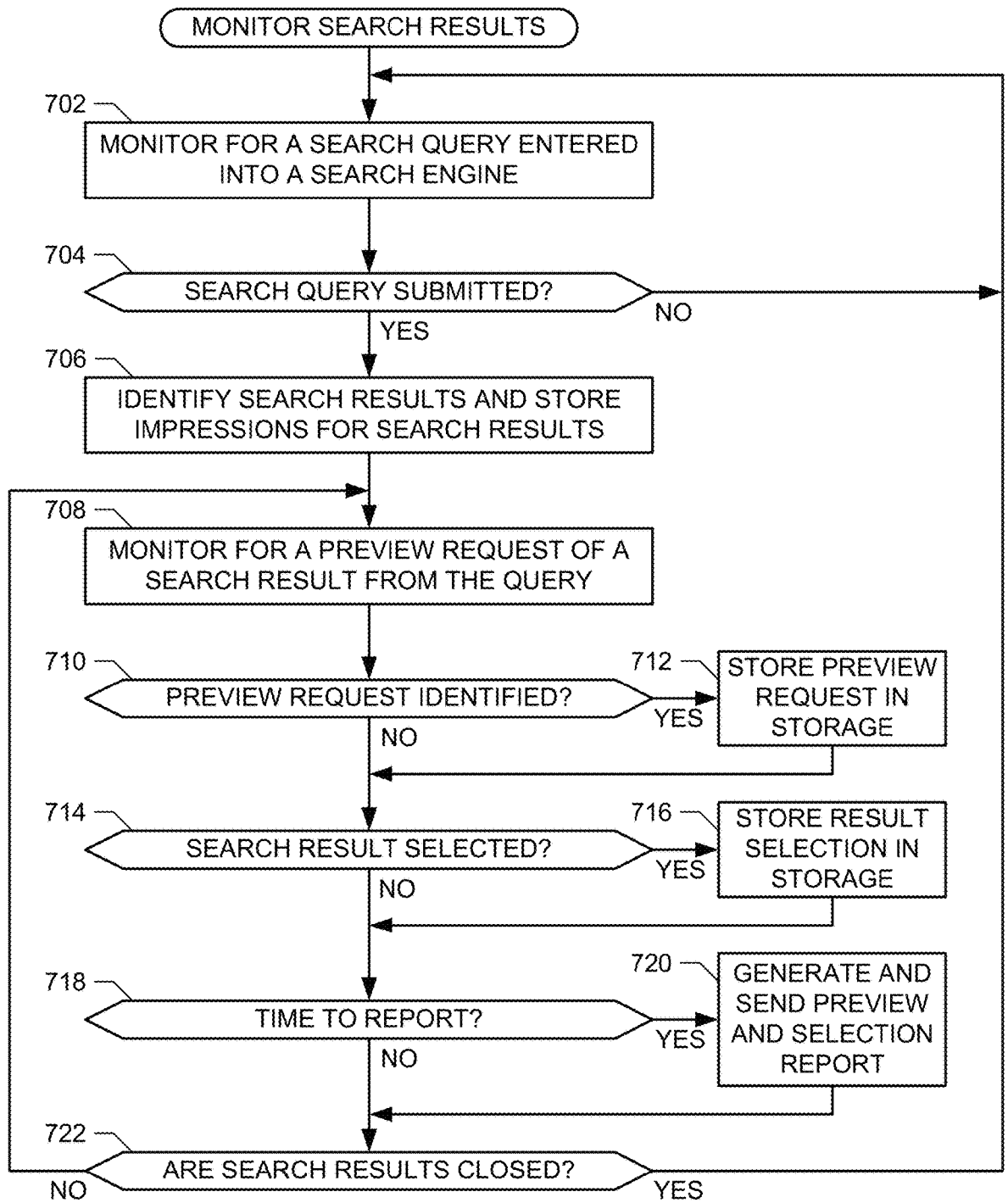
FIG. 7 is a flowchart representative of example machine readable instructions which may be executed to measure search results.
Figure 8:
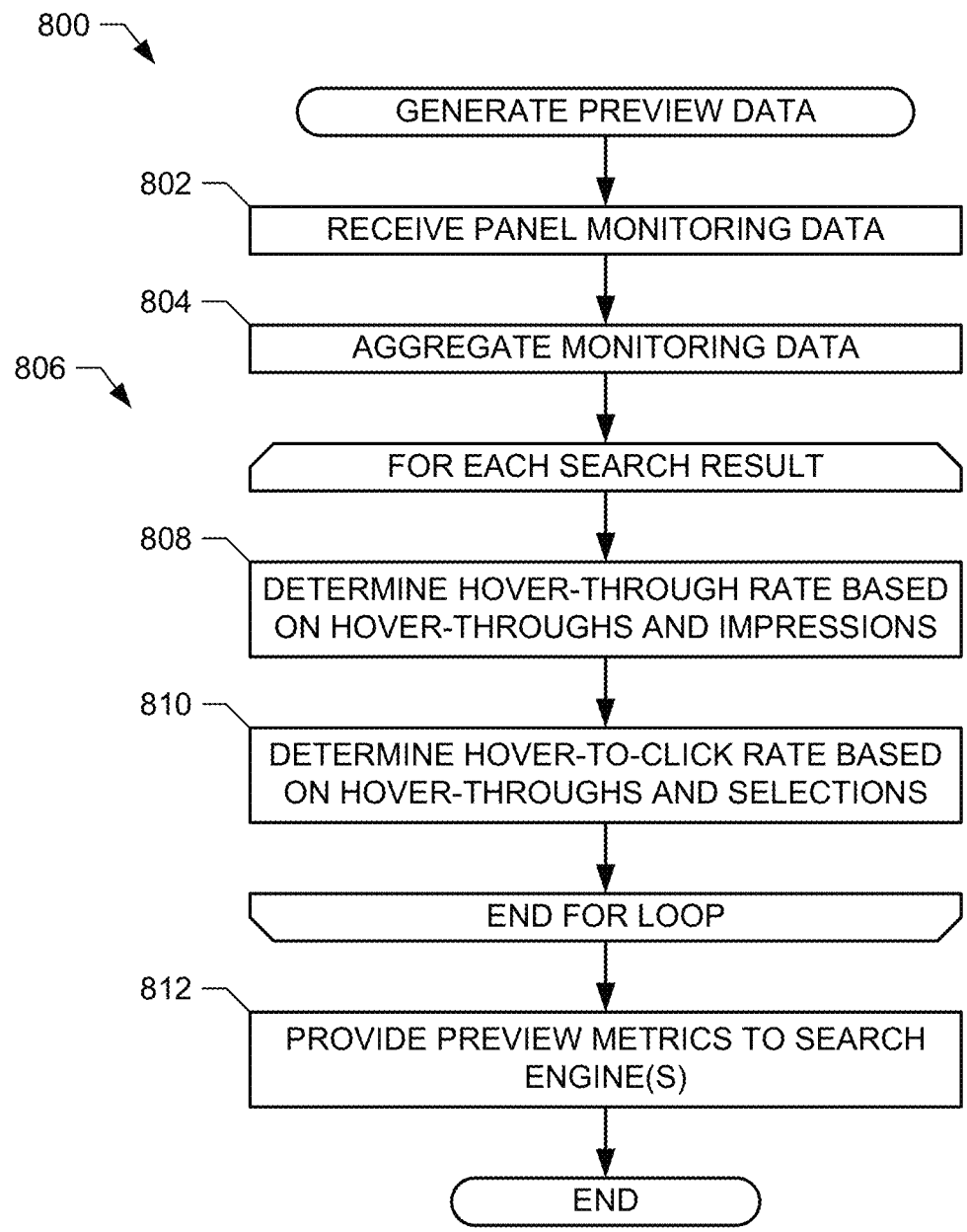
FIG. 8 is a flowchart representative of example machine readable instructions which may be executed to generate preview data.
Figure 9:
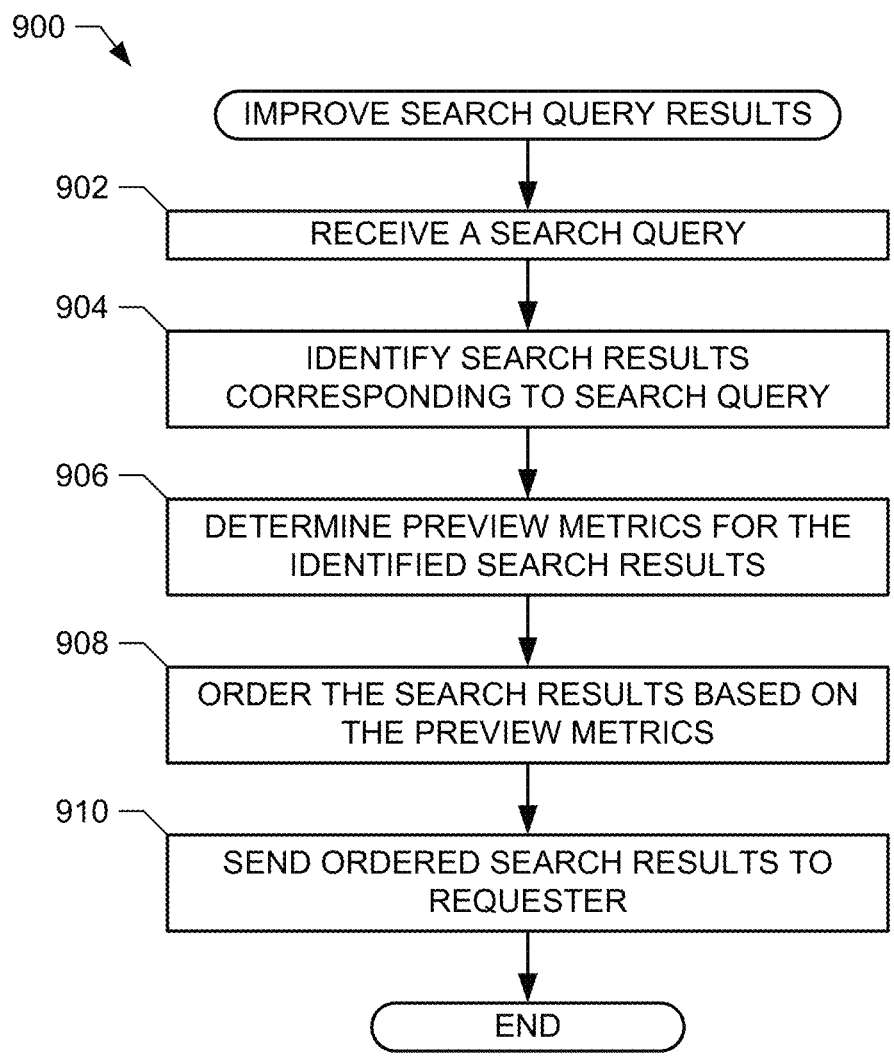
FIG. 9 is a flowchart representative of example machine readable instructions which may be executed to improve search query results.

A flowchart representative of example machine readable instructions for implementing the monitor 114, 200 of FIGS. 1 and/or 2 is shown in FIG. 7. A flowchart representative of example machine readable instructions for implementing the central data processing facility 120 of FIG. 1 is shown in FIG. 8. A flowchart representative of example machine readable instructions for implementing the search engine 116, 300 of FIGS. 1 and/or 3 is shown in FIG. 9. In these examples, the machine readable instructions comprise respective programs for execution by a processor such as the processor 1012 shown in the example computer 1000 discussed below in connection with FIG. 10. The programs may be embodied in software stored on a computer readable medium such as a CD-ROM, a floppy disk, a hard drive, a digital versatile disk (DVD), or a memory associated with the processor 1012, but the entire programs and/or parts thereof could alternatively be executed by a device other than the processor 1012 and/or embodied in firmware or dedicated hardware. Further, although the example programs are described with reference to the flowcharts illustrated in FIG. 7-9, many other methods of implementing the example monitor 114, 200, the example search engine 116, 300, and/or the example central data processing facility 120 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 7 is a flowchart representative of example machine readable instructions 700 which may be executed to measure search results. The example instructions 700 may be executed to implement the monitor 114, 200 of FIGS. 1 and/or 2 to monitor search results. The example instructions 700 of FIG. 7 begin at block 702, in which a monitor (e.g., the monitor 114, 200 of FIGS. 1 and/or 2) monitors for a search query entered into a search engine (e.g., the search engine 116). For example, the search monitor 202 may snoop messages and/or data transmitted between a web browser (e.g., the web browser 112 of FIG. 2) and an operating system (e.g., the operating system 110 of FIG. 2). If a search query is not submitted (block 702), control returns to block 702 to continue monitoring for a search query.

If the search monitor 202 determines that a search query has been submitted (e.g., by a user via the web browser 112) (block 704), the search monitor 202 identifies search results (e.g., from a listing of search results transmitted by the search engine 116) and stores impressions for the identified search results (e.g., in the monitor storage 118 of FIG. 2) (block 706). For example, the search monitor 202 may populate the web site field 504 of FIG. 5 with the URL and/or other identifying information, and/or increment the impressions field 506 for each of the search results in the listing of search results.

The monitor 114, 200 (e.g., via the preview identifier 204 of FIG. 2) monitors for a preview request of a search result (block 708). For example, the preview identifier 204 may monitor the communications and/or data between the web browser 112 and the operating system 110 to identify a request from the web browser 112 to the search engine 116 corresponding to, for instance, HTML and/or a scripting language which, when executed by the web browser 112 in response to a hover event by a user, generates the preview request. If the preview identifier 204 identifies a preview request (block 710), the preview identifier 204 stores a preview event in storage (block 712). The preview identifier 204 may store the preview event by, for example, incrementing the preview events field 508 corresponding to the search result over which the user hovered a cursor.

After storing the preview event (block 712) or if the preview identifier 204 does not identify a preview event (block 710), the selection identifier 206 determines whether a search result has been selected (block 714). The selection identifier 206 may determine whether a search result has been selected by monitoring for a web page request from the web browser 112 and comparing a requested web page with a listing of search results. If the selection identifier 206 identifies a selected search result (block 714), the selection identifier 206 stores the selected search result in the monitor storage 118 (block 716). For example, the selection identifier 206 may increment a selections field 510 corresponding to the selected search result web site A 118a and/or search engine 116 (e.g., Google, Bing, etc.).

After storing the selection (block 716) or if the selection identifier does not identify a search result selection (block 714), the monitor 114 (e.g., via any of the search monitor 202, the preview identifier 204, or the selection identifier 206) determines whether it is time to report the stored monitor results in the monitor storage 118 (e.g., report to the central data processing facility 120 of FIG. 1 via the network 106). The monitor 114 may report at regular or irregular intervals, on a schedule, when the monitor storage 118 has stored a threshold amount of data, at the request of the central data processing facility 120, and/or according to any other trigger and/or methodology. If the monitor 114 determines that it is time to report the data (block 718), the monitor 114 generates a preview and selection report and sends the report to the central data processing facility 120 (block 720).

After sending the preview and selection report (block 720) or if the monitor 114 determines it is not time to send the report (block 718), the search monitor 202 determines whether the search results (e.g., a web page listing the search results that is displayed in the web browser 112) have been closed (block 722). For example, a user may close a window and/or tab of the web browser 112 containing the listing of search results. In some examples, the search monitor 202 may consider the search results to be closed if the user has navigated away from the search results (e.g., selected a search result web page and/or entered the URL of another web page) and has not returned to the search results (e.g., via the "back" button or function provided by the web browser 112) within a threshold amount of time. If the search results have not been closed (e.g., the search results are still displayed or the threshold amount of time has not elapsed since the user has navigated away from the search results) (block 722), control returns to block 708 to monitor for preview requests. If the search results have been closed (block 722), control returns to block 702 to monitor for another search query.

FIG. 8 is a flowchart representative of example machine readable instructions 800 which may be executed to generate preview data. The example instructions 800 may be executed to implement the central data processing facility 120 of FIG. 1 to generate preview data from aggregated monitor data.

The example instructions 800 begins at block 802 with the central data processing facility 120 receiving panel monitoring data. For example, the computers 102, 104 (e.g., via respective monitors) associated with panelist households may transmit measurement data to the central data processing facility 120 in accordance with a schedule or on request by the central data processing facility. The example panel monitoring data may be structured as shown in the table 500 of FIG. 5. The central data processing facility 120 aggregates the received panel monitoring data (block 804). For example, the central data processing facility 120 may generate and/or update a table with a similar or identical structure as the table 500 of FIG. 5 using the panel monitoring data received from multiple panelist sites.

For each search result in the aggregated panel monitoring data, the central data processing facility 120 executes an instruction loop 806 to determine preview metrics. After selecting a search result from the aggregated panel monitoring data, the central data processing facility 120 determines an HTR for the search result based on the hover-throughs (e.g., from the preview events field 508 of FIG. 5) and impressions (e.g., from the impressions field 506 of FIG. 5) for the search result (block 808). For example, the central data processing facility 120 may determine the HTR as the ratio of hover-throughs to impressions.

The central data processing facility 120 further determines the HTC rate for the search result based on the hover-throughs and selections (e.g., from the selections field 510 of FIG. 5) (block 810). For example, the central data processing facility 120 may determine the HTC for the search results as the ratio of hover-throughs to selections. After determining the HTR (block 808) and the HTC (block 810), the loop 806 iterates for the next search result.

After the central data processing facility 120 processes the search results (loop 806, blocks 808 and 810), the central data processing facility 120 provides the preview metrics (e.g., the HTR and/or the HTC) to search engine(s) (block 812). The search engine(s) that receive the preview metrics may use the preview metrics to determine an ordering of future listings of search results as described below in FIG. 9. The example instructions 800 may then end and/or iterate to receive and process additional panel monitoring data.

FIG. 9 is a flowchart representative of example machine readable instructions 900 which may be executed to improve search query results. The example instructions 900 may be executed to implement the example search engine 300 of FIG. 3 to improve search query results. The example instructions 900 may be executed iteratively to service search requests from different requesters.

The example instructions 900 begin by receiving a search request (block 902). The search request may be received from, for example, one of the computers 102, 104 (e.g., via the web browser 112 and the network 106 of FIG. 1). The search processor 302 of the illustrated example identifies search results corresponding to the search query (block 904). For example, the search processor 302 may parse the received search request and query the search index 308 to generate a listing of search results based on the search request.

The search result orderer 304 of the illustrated example determines preview metrics for the search results identified by the search processor 302 (block 906). For example, the search result orderer 304 may receive preview data for web pages and/or web sites listed in the search index 308. In some examples, the search engine 300 subscribes to updates of preview data from the central data processing facility 120 of FIG. 1, which measures and processes search data from computers 102, 104 to determine the preview data. The search result orderer 304 stores the preview data in the preview metric database 310 upon receipt, and accesses the preview metric database when the search processor 302 provides a listing of search results that are generated in block 304 based on the search request received in block 302.

The search result orderer 304 orders the search results based on the preview metric(s) of the web pages and/or web sites in the listing of search results (block 908). For example, the search result orderer 304 may order the search results such that web pages in the search results that have more preview events within the last month are higher in an ordered listing of search results (e.g., as the search results are presented to the user in a web page). In some examples, the search result orderer 304 may order the search results based on (A) the preview data and (B) one or more of (1) keyword relevancy, (2) absolute and/or (3) recent popularity by users of the network 106, (4) pricing models, (5) other factors, (6) fee structure(s), (7) user search histor(ies), (8) user preference(s), (9) page rank(s), and/or (10) any other search result data.

The example search result orderer 304 then provides the ordered search results to the search processor 302, which provides the ordered search results to the requesting user via the network 106 (block 910). For example, the search processor 302 may generate an HTTP response message that includes HTML code which, when rendered by a receiving web browser (e.g., the web browser 112 of FIG. 1), displays the search results to the requesting user in the order determined by the search result orderer 304. The example instructions 900 may then end and/or iterate to service additional search requests.

Figure 10:
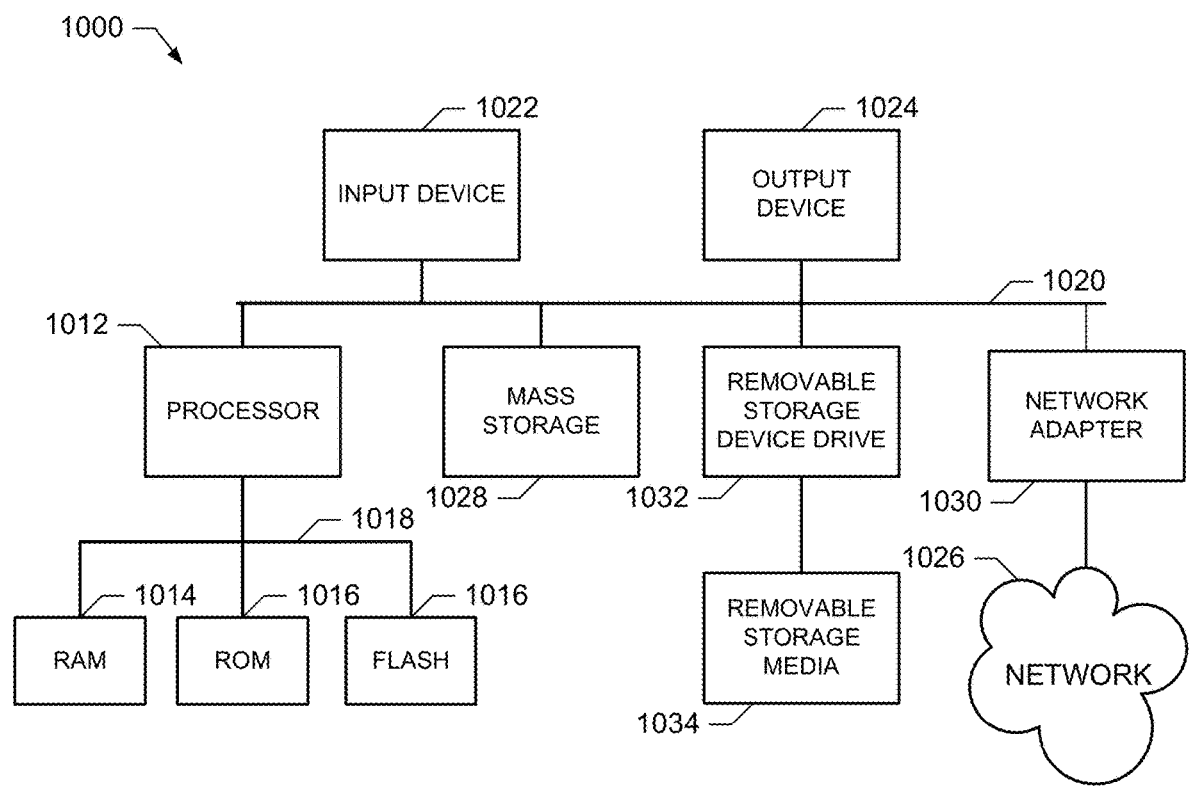
FIG. 10 is a block diagram of an example computer capable of executing the instructions of FIGS. 7-9 to implement the apparatus of FIGS. 1-3.

FIG. 10 is a block diagram of an example computer 1000 capable of executing the instructions 700-900 of FIGS. 7-9 to implement the central data processing facility 120 of FIG. 1, the monitor 200 of FIG. 2, the search engine 300 of FIG. 3. The computer 1000 can be, for example, a server, a personal computer, a mobile phone (e.g., a cell phone), a personal digital assistant (PDA), an Internet appliance, a set top box, or any other type of computing device.

The computer 1000 of the instant example includes a processor 1012. For example, the processor 1012 can be implemented by one or more Intel® microprocessors from the Pentium® family, the Itanium® family or the XScale® family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown).

The computer 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a network adapter 1030 such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices and/or removable storage device drives 1032 capable of receiving removable storage media 1034 or storing software and data. Examples of such mass storage devices 1028 and/or removable storage media 1034 include floppy disk drives, hard drive disks, compact disk drives and digital versatile disk (DVD) drives. The mass storage device 1028 may implement the monitor storage 118, the search index 308, and/or the preview metric database 310. In some examples, the mass storage device 1028 is implemented using arrays of storage devices arranged in, for example, a redundant array of independent disks (RAID) configuration.

The coded instructions 700-900 of FIGS. 7-9 may be stored in the mass storage device 1028, in the volatile memory 1014, in the non-volatile memory 1016, and/or on a removable storage medium such as a CD or DVD.

From the foregoing, it will be appreciated that example methods, apparatus and articles of manufacture have been disclosed to, for instance, measure hover-through rates of search results delivered by search engines. The hover-through rates are advantageously used to measure the value and/or effectiveness of web sites identified by search engines responding to search requests, and/or to order listings of search results in response to web search queries. The hover-through rates are also advantageously used to determine a hover-to-click rate to determine a preview's effectiveness at enticing users to select a corresponding web site link. Additionally or alternatively, example methods, apparatus, and articles of manufacture disclosed above may provide an additional option that advertisers may use to set advertising budgets. For example, an advertiser whose web page(s) and/or web site(s) are more effective in converting web users (e.g., converting to sales) when the users preview the web page in a listing of search results may prefer to pay per-hover-through (e.g., pay-per-preview) as opposed to paying per-click or paying per-impression.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to determine an order for search results in response to a search query, the method comprising:
    determining, by executing an instruction using a processor, a first preview metric and a second preview metric for a first search result and a second search result corresponding to the search query from a requester, the first preview metric including a first ratio based on a first count of preview events for the first search result and a second count of impressions of the first search result in the search query, the second preview metric including a second ratio based on a third count of preview events for the second search result and a fourth count of impressions of the second search result in the search query;
    ordering, by executing an instruction using the processor, the first search result and the second search result based on the first preview metric and the second preview metric; and
    sending, by executing an instruction using the processor, a response to the requester instructing a web browser of the requester to display the ordered search results.

2. The method of claim 1, wherein the first preview metric and the second preview metric correspond to an effectiveness of a first representation of a first web page corresponding to the first preview metric and a second representation of a second web page corresponding to the second preview metric to cause the requester to interact with at least one of the first or second search results.

3. The method of claim 2, further including, when the effectiveness of the first representation of the first web page to cause the requester to interact with the first search result is higher than the effectiveness of the second representation of the second web page to cause the requester to interact with the second search result, ordering the first search result before the second search result.

4. The method of claim 1, wherein the first preview metric and the second preview metric are determined based on previous search queries from at least one of the requester or a second requester.

5. The method of claim 1, wherein the first preview metric and the second preview metric correspond to a demographic of the requester.

6. The method of claim 1, wherein the preview events correspond to representations of web pages generated by a browser executing instructions included in a first web page when a user interacts with an icon associated with a second web page of the web pages, the first web page including the icon, the first search result, and the second search result.

7. The method of claim 6, wherein the instructions, when executed, cause the browser to generate the representations of web pages for display in the first web page without navigating away from the first web page.

8. An apparatus to determine an order for search results in response to a search query, the apparatus comprising:
    a search result orderer to:
        determine a first preview metric and a second preview metric for a first search result and a second search result corresponding to the search query from a requester, the first preview metric including a first ratio based on a first count of preview events for the first search result and a second count of impressions of the first search result in the search query, the second preview metric including a second ratio based on a third count of preview events for the second search result and a fourth count of impressions of the second search result in the search query; and
        order the first search result and the second search result based on the first preview metric and the second preview metric; and
    a search processor to send a response to the requester instructing a web browser of the requester to display the ordered search results.

9. The apparatus of claim 8, wherein the first preview metric and the second preview metric correspond to an effectiveness of a first representation of a first web page corresponding to the first preview metric and a second representation of a second web page corresponding to the second preview metric to cause the requester to interact with at least one of the first or second search results.

10. The apparatus of claim 9, wherein the search result orderer is to, when the effectiveness of the first representation of the first web page to cause the requester to interact with the first search result is higher than the effectiveness of the second representation of the second web page to cause the requester to interact with the second search result, order the first search result before the second search result.

11. The apparatus of claim 8, wherein the first preview metric and the second preview metric are determined based on previous search queries from at least one of the requester or a second requester.

12. The apparatus of claim 8, wherein the first preview metric and the second preview metric correspond to a demographic of the requester.

13. The apparatus of claim 8, wherein the preview events correspond to representations of web pages generated by a browser executing instructions included in a first web page when a user interacts with an icon associated with a second web page of the web pages, the first web page including the icon, the first search result, and the second search result.

14. The apparatus of claim 13, wherein the instructions to cause the browser to generate the representations of web pages for display in the first web page without navigating away from the first web page.

15. A tangible computer readable storage medium comprising instructions to determine an order for search results in response to a search query, the instructions which, when executed, cause a machine to at least:
    determine a first preview metric and a second preview metric for a first search result and a second search result corresponding to a search query from a requester, the first preview metric including a first ratio based on a first count of preview events for the first search result and a second count of impressions of the first search result in the search query, the second preview metric including a second ratio based on a third count of preview events for the second search result and a fourth count of impressions of the second search result in the search query;

order the first search result and the second search result based on the first preview metric and the second preview metric; and send a response to the requester instructing a web browser of the requester to display the ordered search results.

16. The tangible computer readable storage medium of claim 15, wherein the first preview metric and the second preview metric correspond to an effectiveness of a first representation of a first web page corresponding to the first preview metric and a second representation of a second web page corresponding to the second preview metric to cause the requester to interact with at least one of the first or second search results.

17. The tangible computer readable storage medium of claim 16, wherein the instructions, when executed, cause the machine to, when the effectiveness of the first representation of the first web page to cause the requester to interact with the first search result is higher than the effectiveness of the second representation of the second representation to cause the requester to interact with the second search result, order the first search result before the second search result.

18. The tangible computer readable storage medium of claim 15, wherein the first preview metric and the second preview metric are determined based on previous search queries from at least one of the requester or a second requester.

19. The tangible computer readable storage medium of claim 15, wherein the first preview metric and the second preview metric correspond to a demographic of the requester.

20. The tangible computer readable storage medium of claim 15, wherein the preview events correspond to representations of web pages generated by a browser executing instructions included in a first web page when a user interacts with an icon associated with a second web page of the web pages, the first web page including the icon, the first search result, and the second search result.

* * * * *